Figure 1:
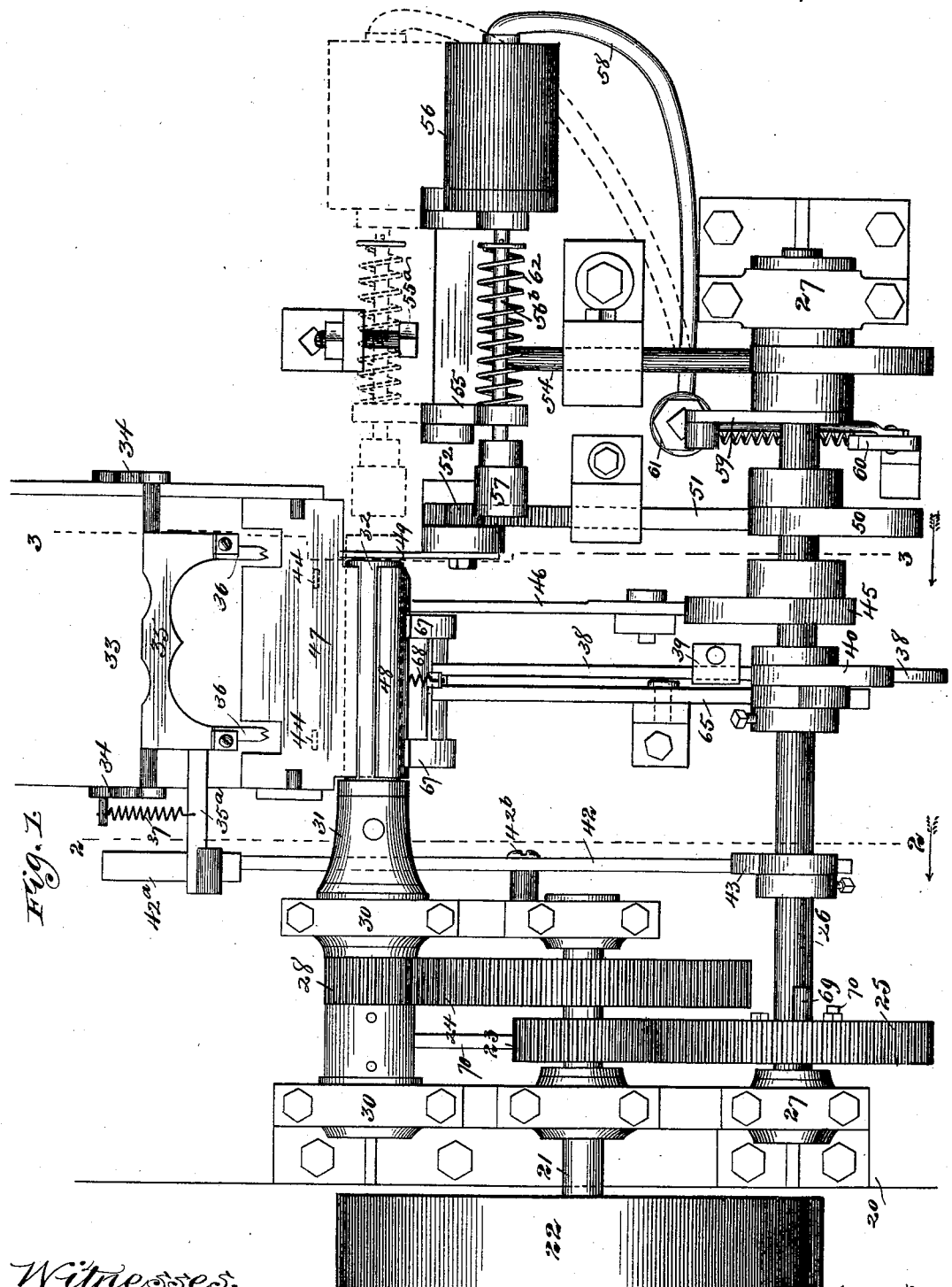

(No Model.) 5 Sheets—Sheet 1.
E. M. HARRINGTON.
MACHINE FOR MAKING TUBULAR CASINGS.

No. 521,792. Patented June 26, 1894.

Witnesses,
J. F. Mann
F. C. Goodwin

Inventor,
Edward M. Harrington
By Offield, Towle & Linthicum
Attys.

(No Model.)  5 Sheets—Sheet 2.
E. M. HARRINGTON.
MACHINE FOR MAKING TUBULAR CASINGS.
No. 521,792.  Patented June 26, 1894.
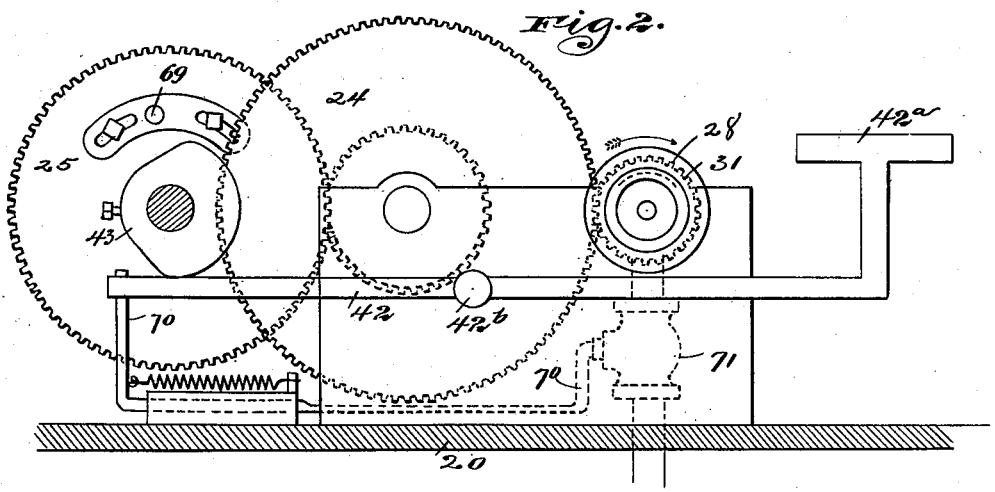
Fig. 2.
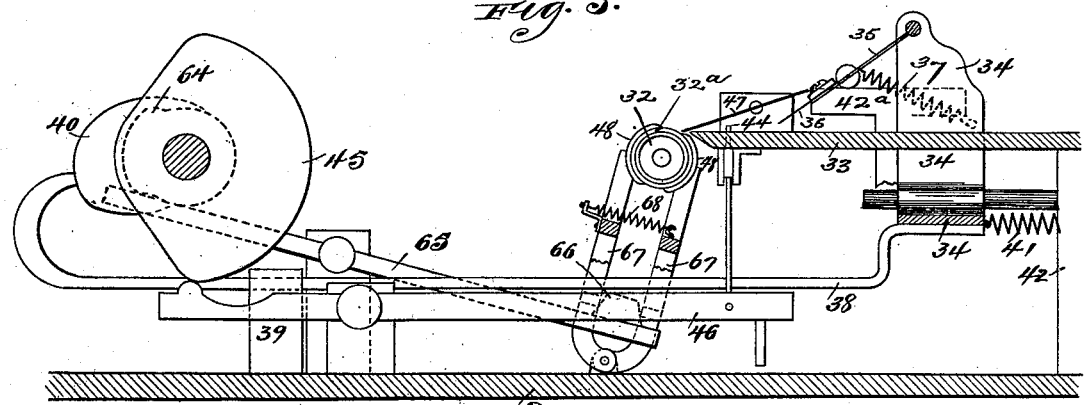
Fig. 3.
Fig. 14.
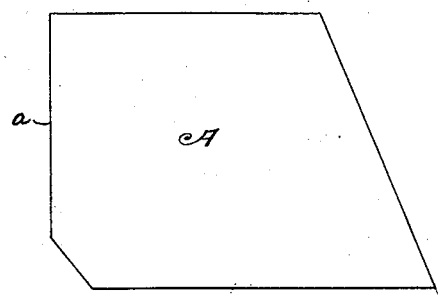
Fig. 12.
Fig. 13.
Fig. 15.
Witnesses:
T. S. Mann
F. B. Goodwin
Inventor,
Edward M. Harrington
By Offield, Towle & Linthicum
Attys.
THE NATIONAL LITHOGRAPHING COMPANY,
WASHINGTON, D. C.

(No Model.) 5 Sheets—Sheet 3.
E. M. HARRINGTON.
MACHINE FOR MAKING TUBULAR CASINGS.
No. 521,792. Patented June 26, 1894.
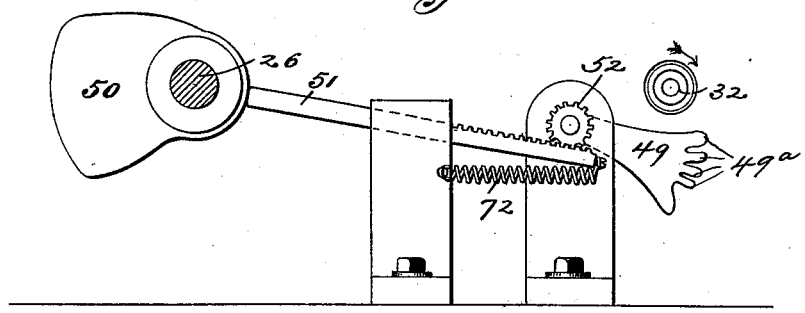
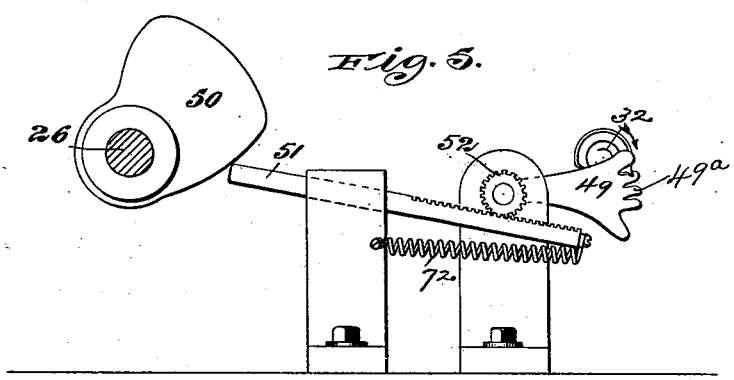
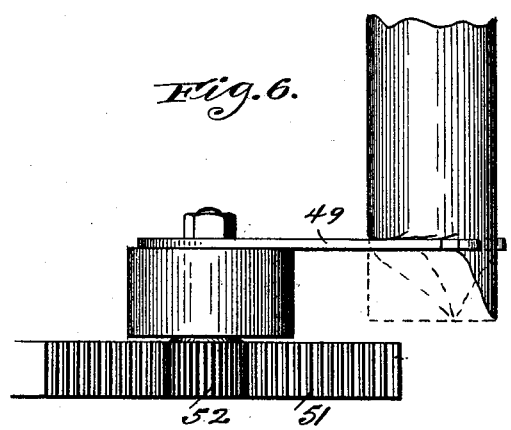

(No Model.) 5 Sheets—Sheet 4.
E. M. HARRINGTON.
MACHINE FOR MAKING TUBULAR CASINGS.
No. 521,792. Patented June 26, 1894.
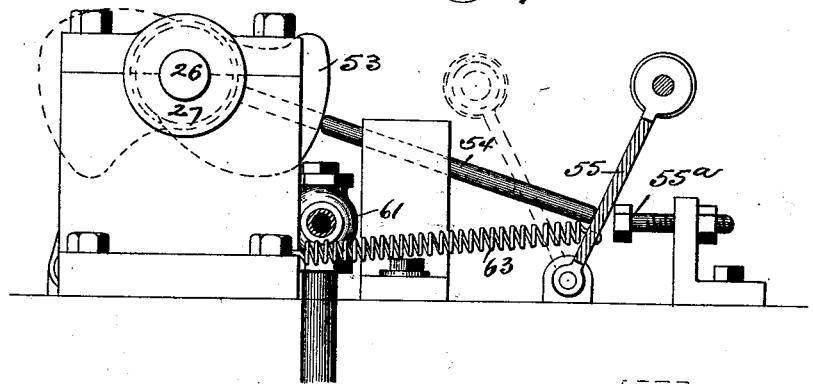
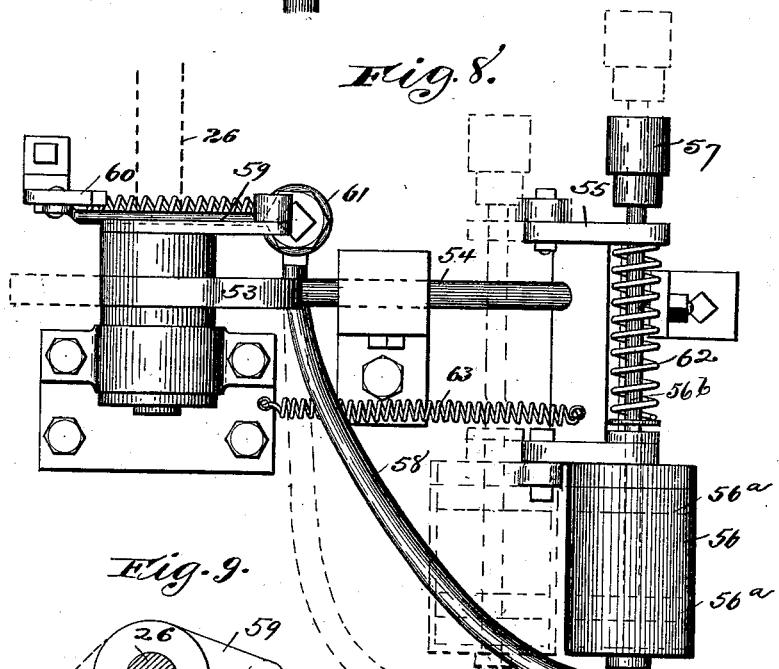
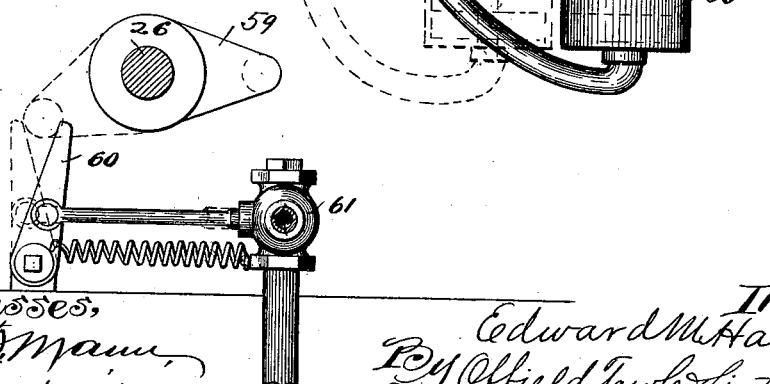
Witnesses:
Inventor
Edward M. Harrington
By Offield, Towle & Linthicum
Attys.

(No Model.)
5 Sheets—Sheet 5.
E. M. HARRINGTON.
MACHINE FOR MAKING TUBULAR CASINGS.
No. 521,792.  Patented June 26, 1894.
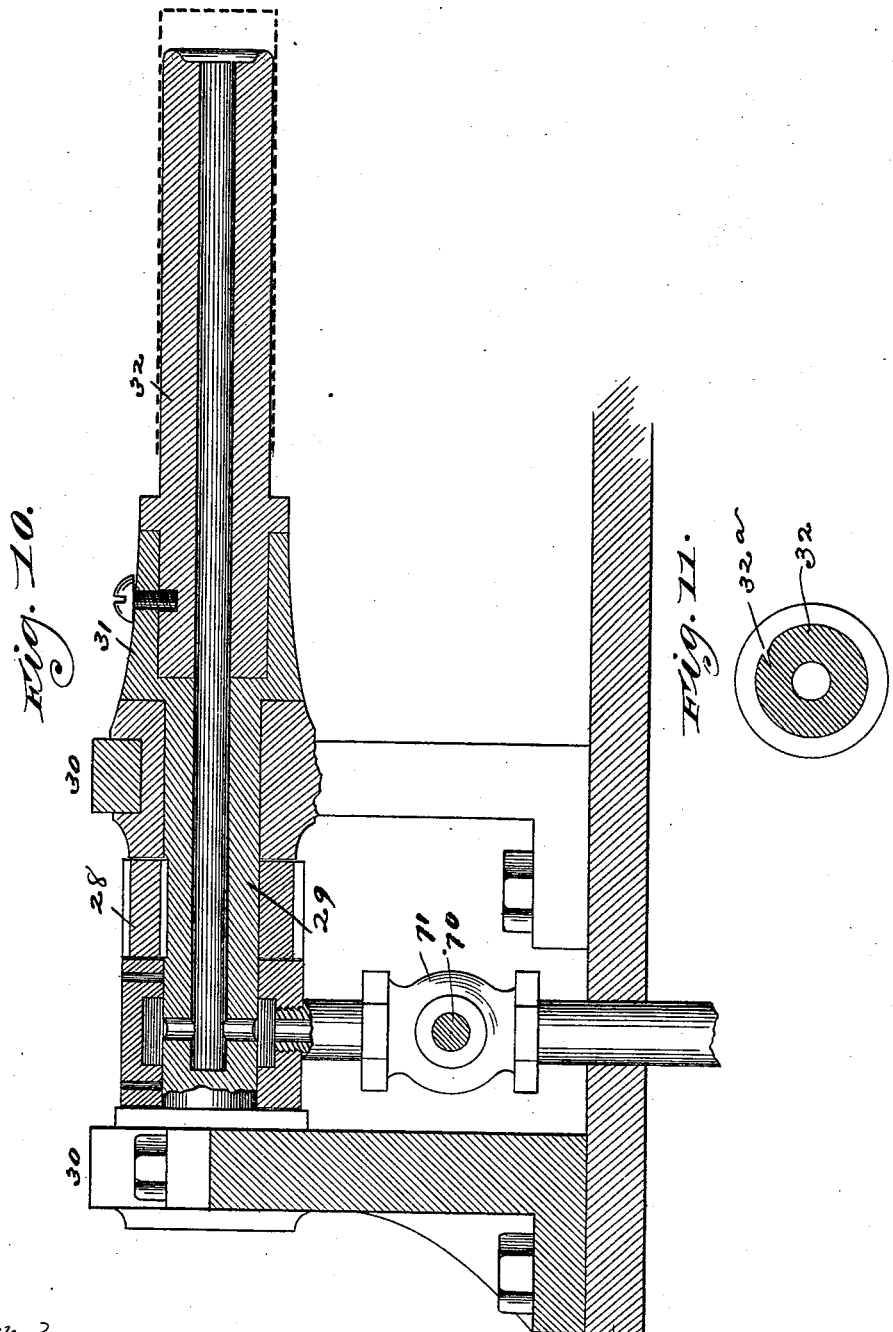

UNITED STATES PATENT OFFICE.

EDWARD M. HARRINGTON, OF MILLER, INDIANA, ASSIGNOR OF ONE-HALF TO WILLIAM B. LEWIS, OF CHICAGO, ILLINOIS.

MACHINE FOR MAKING TUBULAR CASINGS.

SPECIFICATION forming part of Letters Patent No. 521,792, dated June 26, 1894.

Application filed May 25, 1893. Serial No. 475,419. (No model.)

*To all whom it may concern:*

Be it known that I, EDWARD M. HARRINGTON, of Miller, in the county of Lake and State of Indiana, have invented certain new and useful Improvements in Machines for Making Tubular Casings, of which the following is a specification.

This invention relates to a machine for making tubular shells or casings, and is particularly designed for the manufacture of cartridge shells; but I do not limit myself to the special use of the shells or casings as it is obvious that similar covers may be used as bottle wrappers, can covers, &c.

I am aware that a machine is in use for making paper shells wherein paste is applied to the overlapping margins of the blank from which the tube is formed, but the objections to the use of paste are that the process is necessarily slow and the machine soon becomes gummed up with the paste and requires close attention from the operator and frequent stops to clean the parts.

The object of this invention is to provide a machine for making tubes of paper or other material adapted to be formed around a continually revolving former or mandrel, and the novel features are means for automatically presenting the blanks to a revolving mandrel having means provided thereon for securing the edge of the blank as it is presented thereto; clamping jaws and means for operating the same whereby the blank is caused to be tightly wound around the mandrel; a crimping mechanism and its operative means, whereby the end of the tube is crimped or folded in over the end of the mandrel; a plunger and its operative means, whereby the plunger is caused to advance and stamp the crimped end of the shell against the end of the mandrel; and means for automatically removing the shells from the mandrel.

In the accompanying drawings, which form a part of this specification,—Figure 1 is a plan view of the machine. Fig. 2 is a sectional view taken on the line 2—2 of Fig. 1, looking in the direction of the arrow. Fig. 3 is a sectional detail view taken on the line 3—3 of Fig. 1, looking in the direction of the arrow, the parts shown in Fig. 2 being omitted. Figs. 4 to 6 inclusive are detail views of the crimping die and its operative mechanisms, in which Figs. 4 and 5 are sectional elevations, and Fig. 6 is an enlarged detail plan view showing the end of a shell being operated upon by the crimping die. Figs. 7 to 9 inclusive are detail views of the plunger and its operative parts, in which Fig. 7 is a sectional elevation; Fig. 8 a plan view; and Fig. 9 is a detail sectional elevation of a valve and its operating lever and cam. Fig. 10 is a detail view showing a longitudinal section through the mandrel, chuck, shaft and one of the shaft bearings. Fig. 11 is a transverse sectional view of the mandrel. Figs. 12 to 15 inclusive are detail views of the blank and the shell formed therefrom, in which Fig. 12 represents the blank, Fig. 13 represents the blank after it has been formed around the mandrel, Fig. 14 represents the completed shell; and Fig. 15 is an end view of the shell showing the crimped closed end.

In the drawings, 20 represents the bed of the machine upon which is mounted in suitable bearings a shaft 21 having a pulley 22 and gears 23 and 24, the former of which gears inmeshes with a gear 25 upon a shaft 26, which shaft is journaled in the boxes 27 and has secured thereto a number of cams which with their several operations will be hereinafter described. The gear 24 inmeshes with a pinion 28 upon a hollow shaft 29, said shaft being journaled in the boxes 30 and having a chuck 31 in which is secured the hollow mandrel 32.

The position of the several parts of the machine as shown in Fig. 1 represents their relative positions immediately after one of the blanks A has been presented to the mandrel. A feed box 33 is secured upon the bed 20 and has its forward edge beveled as shown in Fig. 3.

Slidably secured with the feed box is a yoke 34 having pivotally secured thereto a wing 35, which wing is provided with adjustable feed dogs 36, a projecting arm 35ª and a spring 37, which spring has one end secured to the arm 35ª and its opposite end secured to the yoke 34 normally depressing the feed dogs against the feed box. Secured to the yoke 34 beneath the feed box is an operating bar 38, which projects forward through a guide post 39 and has its forward end curved to bear against a cam 40 on the shaft 26. The spring 41 secured respectively to the yoke 34 and the standard 41ª normally holds the curved end of the bar 38 in touch with the cam 40. A lever 42 having a head 42ª is pivoted at 42ᵇ and is rocked on its pivot by the cam 43 on the shaft 26. When the lean side of the cam is in contact with the lever the head 42ª is released from contact with the arm 35ª and the feed dogs are permitted to impinge the blank A which has been placed upon the feed bed, the forward edge $a$ of the blank abutting the stops 44, which stops are lowered through the action of the cam 45 on shaft 26 upon the pivoted lever 46. The blank A having been advanced to the mandrel and the feed dogs released therefrom through the action of the lever 42, the forward edge $a$ of the blank will be held against the mandrel by the pivoted guide 47 and said edge will enter the slit 32ª in the mandrel and be drawn down beneath the clamp 48 and the blank will be wound around the mandrel. The crimper 49 is raised through the action of cam 50 on shaft 26, rack bar 51 and pinion 52. The crimper 49 has a series of crimping fingers and as it is raised these fingers successively engage the edge of the shell, thus bending it into a series of short overlapping crimps or folds, as illustrated in Figs. 5 and 6. The upward movement of the crimper continues until it has passed above the plane of or cleared the mandrel, in which position it remains until after the shell is removed. Simultaneously with the action of the crimper the cam 53, shaft 26 acting upon rod 54 causes the pivoted frame 55 bearing the cylinder 56 and plunger 57 to advance to a position indicated by the stop 55ª wherein the plunger will be in line with the mandrel. Air under pressure is admitted to the cylinder through the flexible tube 58 by the action of the stud of arm 59 on shaft 26 upon the lever 60, said lever controlling the action of valve 61. The admission of air under pressure to cylinder 56 causes the piston 56ª, piston rod 56ᵇ and plunger 57 to advance and forcibly strike the plunger against the crimped end of the shell and mandrel, causing the several folds of the end of the shell to conform to the impression produced by the shock.

The usual vent is provided in the cylinder whereby the air is allowed to escape and the spring 62 returns the piston to its normal position. As the piston returns to its normal position the cam 53 presents its low side to the rod 54 and the spring 63 which holds the rod 54 in touch with the cam 53 causes the frame 55 to return to the position shown in dotted lines in Figs. 7 and 8.

The shell is removed from the mandrel in the following manner: Cam 64 (Fig. 3) depresses the pivoted lever 65 causing the wedge shaped block 66 to ascend and spread the pivoted arms 67, which arms carry the clamps 48 and are normally drawn toward each other by the spring 68. Compressed air is admitted to the hollow shaft 29 through the action of the stud 69 secured upon gear wheel 25, withdrawing the spring controlled valve stem 70 of valve 71. The compressed air passes through the hollow of the mandrel, strikes the inside of the crimped end of the shell formed thereon forcing the shell therefrom. The cam 50 presents its low side to the rack bar 51 and through the action of spring 72, rack bar 51 and pinion 52 the crimper is returned to its normal position.

Without limiting my invention, therefore, to precise details of construction, I claim—

1. A machine for making tubular shells, comprising in combination a rotatable hollow mandrel, mechanism whereby blanks of material are successively presented to the mandrel, means for securing the blanks to the mandrel, means for crimping one end of the shell upon the mandrel, and means whereby air under pressure is admitted to the hollow of the mandrel to discharge the shell, substantially as described.

2. A machine for making tubular shells, having a revoluble hollow mandrel, said mandrel having a longitudinal slit to receive the edge of a blank of material whereby the material is caused to be wound around the tube upon the mandrel, a crimper to close one end of the tube and means whereby air under pressure is admitted to the hollow of the mandrel to remove the tube therefrom, substantially as described.

3. In a machine for making tubular shells, the combination with a revolving mandrel and means for winding a blank about the mandrel to form a hollow shell with one of its ends projecting beyond the mandrel, of a crimper for crimping or folding the projecting end of the shell, comprising a crimper arm pivoted at its outer end and having a series of rigid crimping fingers thereon adapted to engage the projecting end of the shell and crimp it, and means for rocking the said crimper upon its pivot, substantially as described.

4. In a machine for making tubular shells, the combination with a rotatable mandrel slotted to receive the edge of a blank, a pivoted crimper having rigid crimping fingers and a pivoted plunger normally supported out of line with the mandrel, means for rocking the crimper upon its pivot, means for moving the plunger into line with the mandrel and for reciprocating the plunger whereby to impinge it upon the outer side of the crimps or folds and compress them against the end of the mandrel, and means for discharging the finished tube from the mandrel, substantially as described.

5. A machine for making tubular shells having a rotatable mandrel provided with a slit to receive the edge of a blank of material and means for rotating the mandrel with the engaged blank to form a tube, a crimper adapted to close one end of the tube, a plunger and a pressure cylinder into which one end of the plunger is projected, said plunger and cylinder being pivotally mounted and adapted to be moved into line with the mandrel, and means for admitting air under pressure into the cylinder behind the plunger whereby the plunger is caused to impinge the crimped end of the shell, substantially as described.

6. In a machine of the class described, the combination with a revoluble hollow mandrel having a longitudinal slit whereby to secure material therewith, feed mechanism, clamping jaws, crimper, plunger, means whereby air under pressure is caused to operate the plunger, and means for admitting compressed air to the mandrel to discharge the shell, substantially as described.

7. A machine for forming shells or tubes from flat blanks, comprising in combination the following instrumentalities; a rotatable mandrel, means for feeding the blanks to the mandrel, means for securing the margin of the blank to the mandrel, means for crimping or folding an end of the shell which is projected beyond the mandrel, and pneumatic means for discharging the shell, substantially as described.

8. In a machine of the class described, the combination with a hollow revolving mandrel and means for securing the margin of a blank to and winding it about the mandrel into the form of a tubular shell, means for closing one end of the tube and means for admitting air under pressure to the hollow of the mandrel whereby to discharge the shell, substantially as described.

EDWARD M. HARRINGTON.

Witnesses:
C. C. LINTHICUM,
N. M. BOND.